United States Patent [19]

Chou et al.

[11] Patent Number: 5,757,180
[45] Date of Patent: May 26, 1998

[54] DISK TYPE OF ABSOLUTE-POSITION MAGNETIC ENCODER FOR ROTARY DEVICES

[75] Inventors: Chen Shih Chou; Tsai Wei Shin; Hukao Fu Jen; Huang Shih Ming, all of Hsinchu, Taiwan

[73] Assignee: Industrial Technology Research Institute, Hsinchu, Taiwan

[21] Appl. No.: 594,548

[22] Filed: Jan. 31, 1996

Related U.S. Application Data

[63] Continuation-in-part of Ser. No. 347,510, Nov. 29, 1994, abandoned.

[51] Int. Cl.$^6$ .............................. G01B 7/30; G01R 33/06
[52] U.S. Cl. .............................. 324/207.2; 324/207.25
[58] Field of Search ................ 324/207.11–207.26, 324/260, 262; 338/32 H, 32 R

[56] References Cited

U.S. PATENT DOCUMENTS

| | | | |
|---|---|---|---|
| 4,746,862 | 5/1988 | Ueki | 324/174 |
| 4,904,937 | 2/1990 | Takahashi et al. | 324/207.21 |
| 4,983,915 | 1/1991 | Rossi | 324/207.25 |
| 5,029,304 | 7/1991 | Tolmie, Jr. | 324/207.2 |
| 5,097,209 | 3/1992 | Santos | 324/207.25 |
| 5,307,013 | 4/1994 | Santos et al. | 324/207.2 |
| 5,370,015 | 12/1994 | Moscatelli | 324/207.2 |

*Primary Examiner*—Sandra L. O'Shea
*Assistant Examiner*—Jay M. Patidar
*Attorney, Agent, or Firm*—W. Wayne Liauh

[57] ABSTRACT

A disk type absolute-position magnetic encoder for rotary devices. It includes: (a) a circular magnetic shielding disk; (b) a plurality of permanent circular magnetic rings of varying diameters disposed on both sides of the magnetic shielding disk; (c) a circular neutral zone between every two adjacent circular magnetic rings, the circular neutral zone having a width wide enough such that it is effectively free of magnetic interference; (d) a plurality of sensors each being located at a distance from one of the circular ring for detecting a position of the rotary device; and (e) a spindle transversely running through the magnetic shielding disk. Compared to the prior art devices of optical and drum types, the disk type magnetic encoder provides substantial space savings. The magnetic shielding disk, the plurality of permanent circular magnetic rings, and the sensors are all mounted in a cylindrical housing.

2 Claims, 5 Drawing Sheets

DISK TYPE OF ABSOLUTE-POSITION MAGNETIC ENCODER FOR ROTARY DEVICES

This is a continuation-in-part of application Ser. No. 08/347,510 filed on Nov. 29, 1994, now abandoned.

BACKGROUND OF THE INVENTION

Generally, when the absolute position of a rotary device, such as a motor or a mechanical shaft, has to be detected, each position of such device is usually detected with a sensor, which can generate a binary identification code (as shown in FIG. 1). The binary identification code can be generated with a number of conventional method, such as an optical type of encoder or a drum-shaped encoder. Either of the two conventional methods can be used to generate a binary code by an on-and-off means of a sensor so as to find out the absolute position of a rotary device.

FIG. 2 illustrates a conventional optical type absolute-position encoder, which comprises a signal disk 10, a light-hole disk 11, a plurality of LED 12, at least two signal receiver 13, and a spindle 14. The signal disk 10 is provided with a plurality of see-through portions 101 indicated with black rectangles (as shown in FIG. 3), and a plurality of solid portions 102 indicated with white rectangles. As soon as the LED 12 shines light at the signal disk 10, a portion of the light will be blockaded with the solid portions 102, while another portion of the light will pass through the disk 10. By means of the alternate blockading and passing-through of the light, a binary identification code will be generated with the signal receiver 13, whereby the position of a rotary device can be detected. The drawback of such optical type of encoder is that the signal can only be generated with one side of the signal disk 10, because the LED 12 is mounted on one side of the signal disk 10, while the signal receiver 13 being mounted on the opposite side. In other words, the signal to indicate position can only be generated at one side of the encoder, and therefore the resolution of the encoder is limited, and the whole encoder cannot be made to be very thin. Furthermore, the thickness of the encoder will be increased considerably when a plurality of signal disks 10 are used. The optical part of the encoder is also subject to interferences from smoke, moisture and moisture. In order to avoid such interference, the structure of the encoder has to be improved at a great cost.

Another conventional encoder is shown in FIG. 4, which illustrates a conventional drum-shaped absolute-position magnetic encoder. The key feature of such an encoder is that its rotary portion looks like a drum structure, which comprises a magnetic drum 20, a spindle 21 and a sensor assembly 22. The outer surface of the magnetic drum 20 is mounted with a layer of permanent magnets 201, which is provided with a plurality of magnetic rings 202, 202', 202" and 202'" having different number of magnetic poles. A neutral zone is located between two magnetic rings. Each of the magnetic rings 202, 202', 202" and 202'" is positioned opposite to a sensor 23 of the sensor assembly 22. The position of a rotary device can be shown by means of an output signal of the sensor assembly 22. The main drawbacks of such encoder are that it has a relatively large size, takes up a large space, and a longer axial length of the permanent magnets in case a higher resolution is required by increasing the number of the magnetic rings. In that case, the size of the encoder will be further increased. Moreover, since the permanent magnets 201 are mounted on the surface of the magnetic drum 20 in a radial form, the outer surface thereof has to be ground precisely, i.e., more processing cost will be resulted.

SUMMARY OF THE INVENTION

The present invention relates to a flat type absolute-position magnetic encoder. One of the key elements of the present invention is that a position identification magnetic encoder is used for indicating the position of a rotary device. Such encoder comprises at least a magnetic shielding disk, a plurality of permanent magnets and sensors. The permanent magnets are mounted on both sides of the magnetic shielding disk. Each permanent magnet is provided with a magnetic ring having a predetermined number of magnetic poles; and each magnetic ring is furnished with an opposite sensor to form into a flat structure. Moreover, additional magnetic rings can be mounted to the outer diameter surface of the permanent magnet so as to obtain a higher resolution. The outer magnetic rings can be furnished with more magnetic poles without increasing much space. Further, since the magnetic poles furnished on a permanent magnet can be done without precise grinding process, it will simplify the manufacturing procedures, and reduce the manufacturing cost, too.

DETAILED DESCRIPTION

Figure 1:
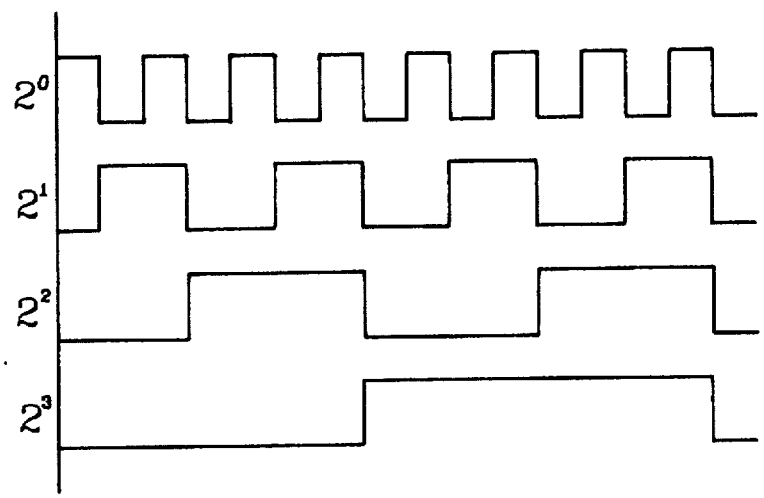
FIG. 1 illustrates an output of a binary identification code generated with a conventional absolute-position encoder.
Figure 2:
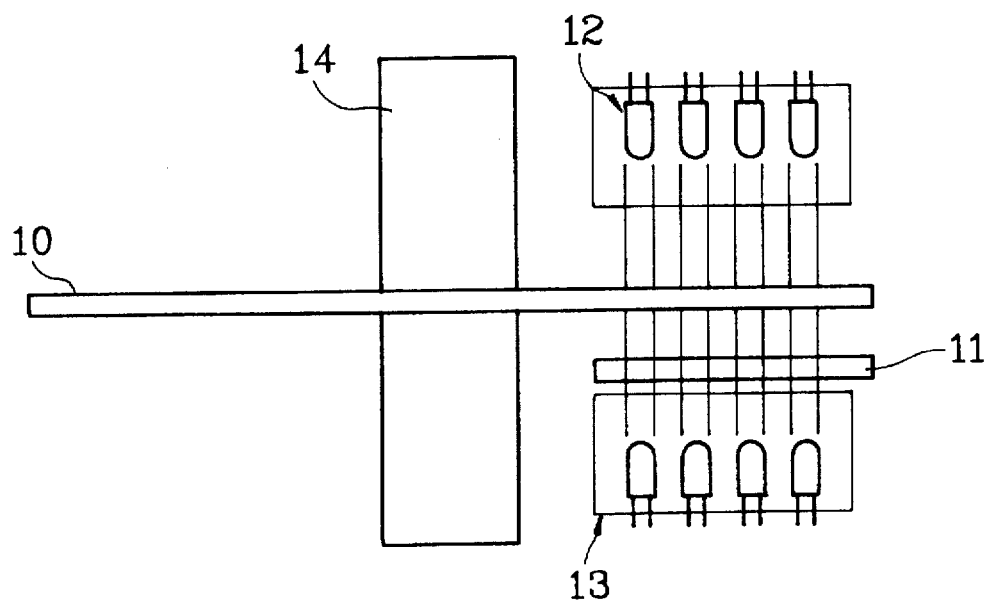
FIG. 2 shows a conventional optical type of absolute-position encoder.
Figure 4:
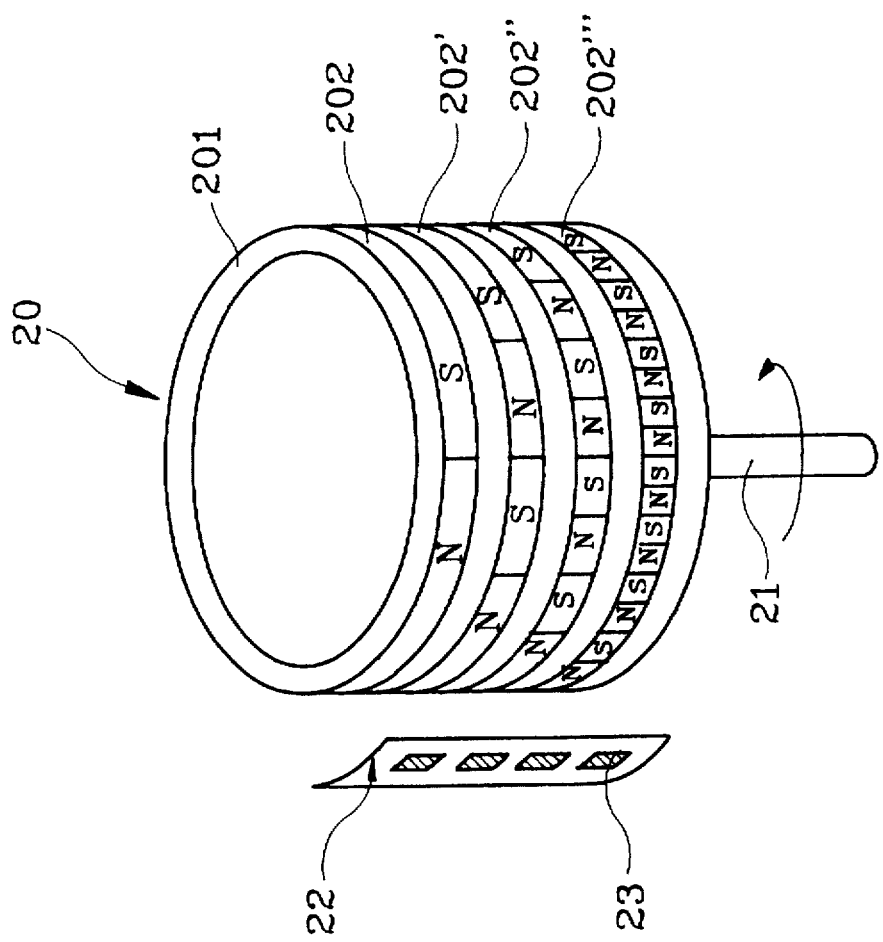
FIG. 4 is a perspective view of a conventional drum type of magnetic absolute-position encoder.
Figure 3:
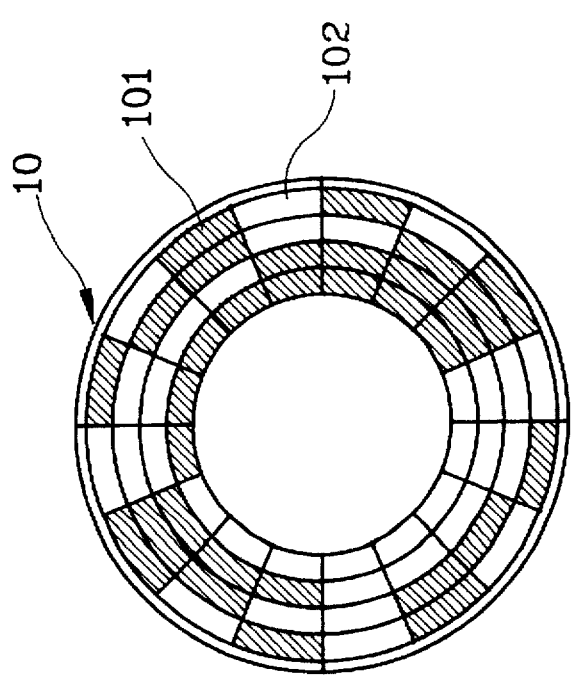
FIG. 3 is a bird view of a signal disk in a conventional optical type of absolute-position encoder.
Figure 5:
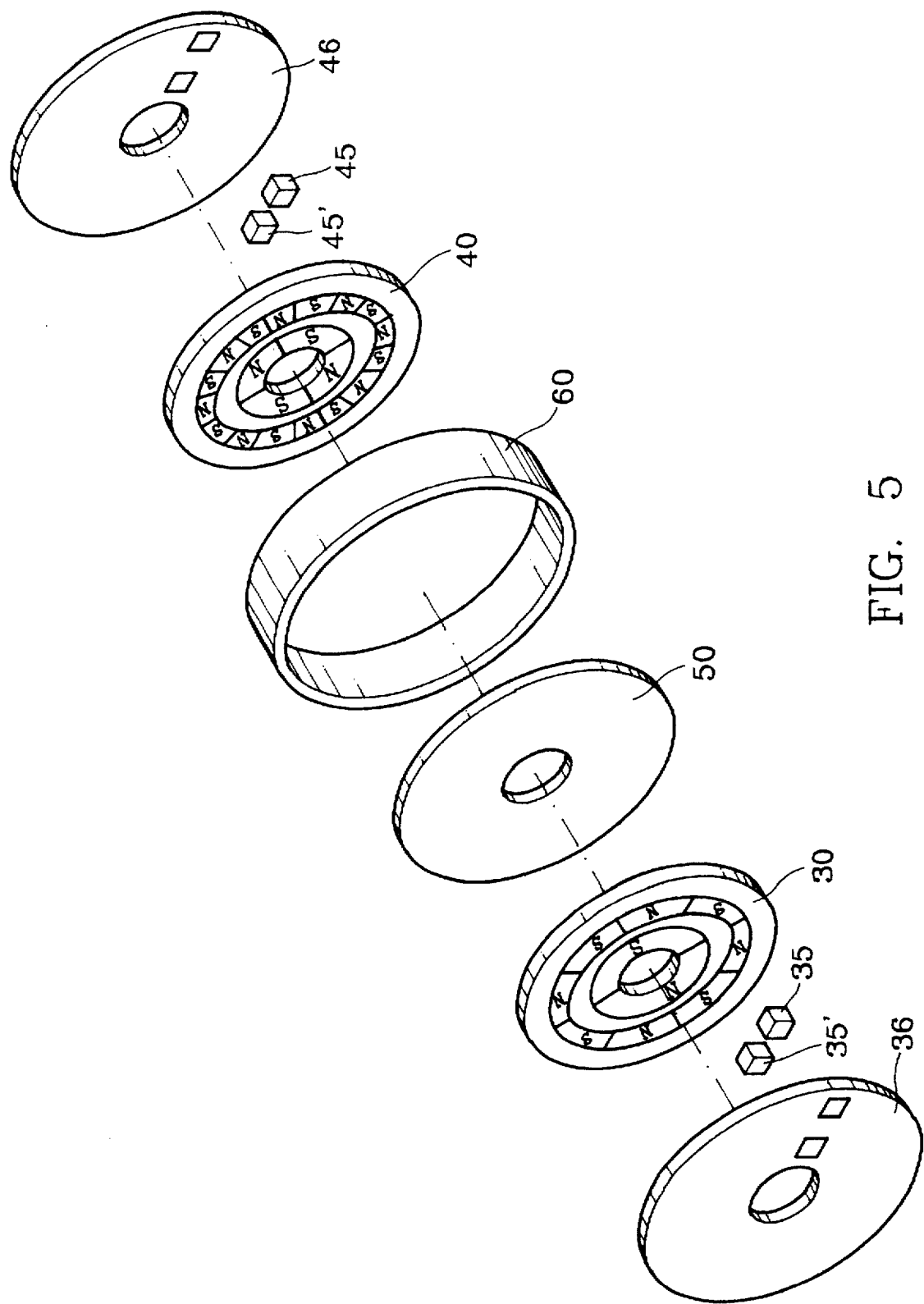
FIG. 5 is a disassembled view of an embodiment according to the present invention.
Figure 7:
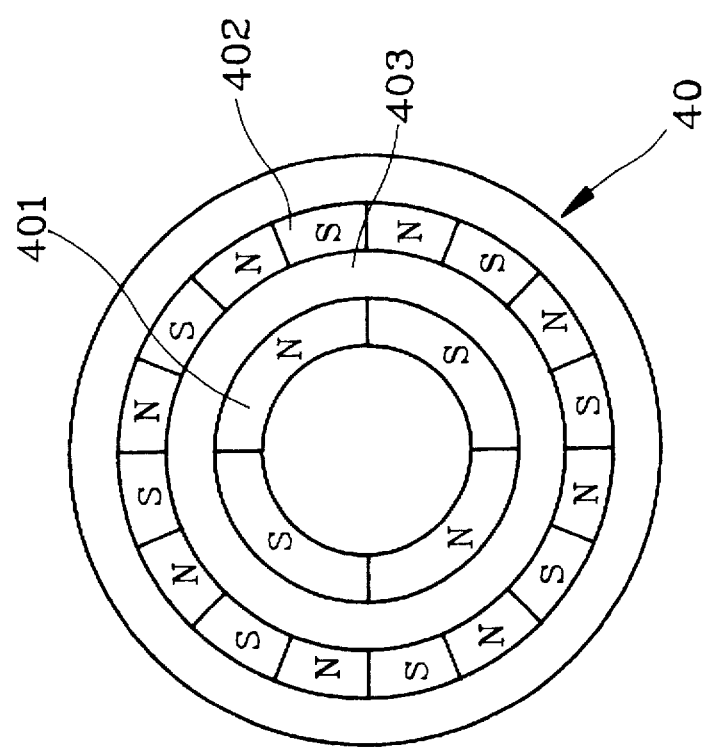
FIG. 7 is a top view of a lower permanent magnet in the embodiment according to the present invention.
Figure 6:
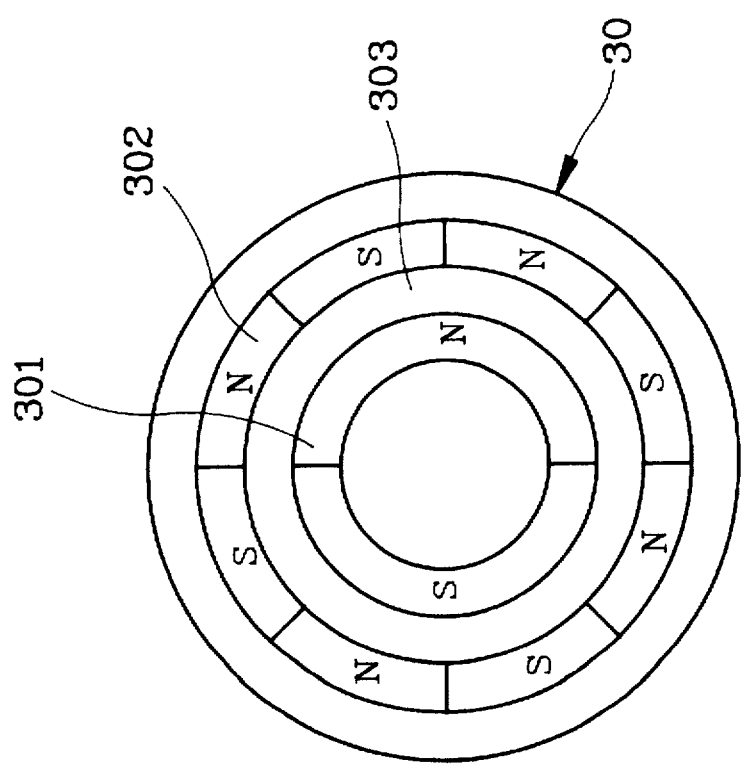
FIG. 6 is a top view of an upper permanent magnet in the embodiment according to the present invention.
Figure 8:
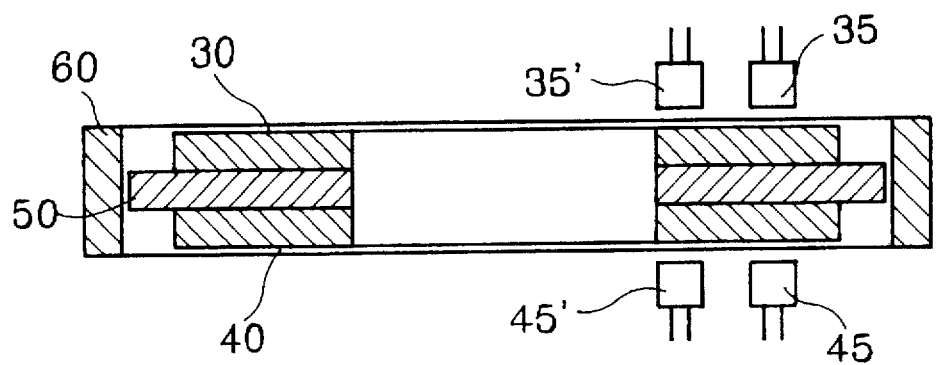
FIG. 8 is a side view of the embodiment according to the present invention upon being in operation.

FIG. 5 is a disassembled view of a preferred embodiment of the present invention, which comprises two layers of permanent magnets separated by a magnetic shielding disk 50. One of the permanent magnets mounted on top side of the magnetic shielding disk 50 is referred to as the upper permanent magnet 30, while the other permanent magnet mounted under the bottom side of the disk 50 is referred to as the lower permanent magnet 40. All the aforesaid parts are in a flat disk shape, and each of them has a center hole for receiving a spindle. The surface of the upper permanent magnet 30 is furnished with two magnetic rings (as shown in FIG. 6), in which one is a two-pole magnetic ring 301, while the other is an 8-pole magnetic ring 302. A neutral zone 303 is provided which is located between the two magnetic rings 301 and 302. The width of the neutral zone 303 is the same as that of the two magnetic rings. The neutral zone 303 has no any magnetic effect so as to prevent it from causing magnetic interference between the two magnetic rings 301 and 302 in the upper permanent magnet 30. A similar arrangement is provided in the lower permanent magnet 40 (See FIG. 7.) In this embodiment of the present invention, the Hall effect sensors 35, 35', and 45 and 45' are used, and they are also mounted on the Hall-effect sensor-mounting disks 36 and 46, respectively. In the present invention, all parts, such as the magnetic shielding disk 50, the upper permanent magnet 30, the lower permanent magnet 40, the sensors 35, 35', 45 and 45', and the Hall-effect sensor-mounting disks 36 and 46, are mounted in a cylindrical housing 60 (as shown in FIGS. 5 and 8).

Figure 9:
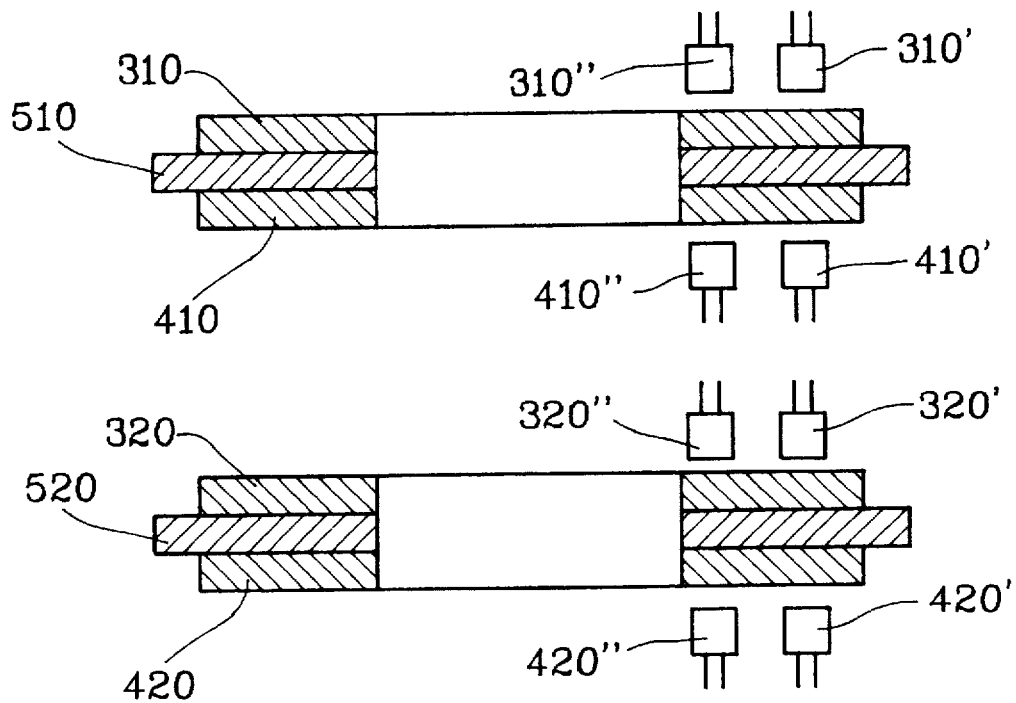
FIG. 9 is a side view of embodiment-2 according to the present invention upon being in operation.

The embodiment according to the present invention includes four magnetic rings, which can provide a resolving power of 16 (i.e., $2^4$); each of the 16 positions is corresponding to a binary identification code. By means of the sensors 35, 35 and 45 and 45', a position of a rotary device can be obtained. The structure of the embodiment according to the present invention can be a very small unit having 13 mm in diameter and 5 mm thick. If additional resolving power is required, the outer diameter of the present invention can be increased so as to mount more magnetic rings with more poles therein. The sensors will be a multi-head type of the magnetic sensors. The other way to increase the resolving power is to use a multi-magnetic shield disk. Such magnetic shielding disk may be mounted with one permanent magnet on one side or two permanent magnets on both sides, respectively. FIG. 9 illustrates a side view of a second preferred embodiment according to the present invention, in which two magnetic shielding disks 510 and 520 are provided. The two magnetic shielding disks 510 and 520 are provided with permanent magnets of 310 and 410, and 310 and 320, respectively, and eight corresponding sensors 310', 310", 410', 410", 320', 320", 420', and 420" are provided in positions as shown in FIG. 9, so as to improve the resolution to $2^8$, or 256 positions. If the resolution requirement is not very high, the magnetic shielding disk 50 may be mounted with only one upper permanent magnet 30. The number of the magnetic rings on the upper permanent magnet 30 can be determined in accordance with the actual requirement. Of course, the number of sensors such as 35 and 35' can be determined in accordance with the number of the magnetic rings. In this case, the magnetic shielding disk 50 can be omitted without affecting the function of the present invention because of only one upper permanent magnet 30 is used. The magnetic shielding disk 50 can also be omitted in the event of using two layers of permanent magnets 30 and 40 by simply increasing the thickness of the two permanent magnets 30 and 40 so as to avoid magnetic interference between them. Furthermore, the permanent magnets used in the present invention are made by gluing method or injection molding method instead of the conventional precision grinding method by means of a drum-shaped magnet. Therefore, the cost and efforts required for making the magnet have been improved considerably. Moreover, the resolving power is determined by the number of poles of the largest magnetic ring; under the same requirement of a resolving power, both the drum-shaped or flat-type structure of the encoder will have about the same outer diameter. In the drum-shaped structure, the magnetic ring having less magnetic poles has to extend in the axial direction; in the flat-type structure, the magnetic ring having less magnetic poles will be extended in radial direction, therefore a great deal of space can be saved.

What is claimed is:

1. A disk type absolute-position magnetic encoder for rotary devices, comprising:

(a) a magnetic shielding disk in a substantially circular form;

(b) a plurality of permanent circular magnetic rings of varying diameters disposed on both sides of said magnetic shielding disk;

(c) a substantially circular neutral zone between every two adjacent said circular magnetic rings, said circular neutral zone having a substantial width such that it is free of magnetic interference;

(d) a plurality of sensors each being located at a distance from one of said circular rings for detecting a position of said rotary device; and (e) a spindle transversely running through said magnetic shielding disk and said permanent circular magnetic rings;

(f) wherein said magnetic shielding disk, said plurality of permanent circular magnetic rings, and said sensors are all mounted in a cylindrical housing.

2. The disk type absolute-position magnetic encoder for rotary devices according to claim 1 wherein each of said sensors is a Hall effect sensor.

* * * * *